US008320902B2

(12) United States Patent
Moring et al.

(10) Patent No.: US 8,320,902 B2
(45) Date of Patent: Nov. 27, 2012

(54) SYSTEM AND METHOD FOR SELECTING SERVICES IN A WIRELESS COMMUNICATION NETWORK

(75) Inventors: John Thomas Moring, Encinitas, CA (US); Dmitri Khijniak, San Diego, CA (US); Justin Paul McNew, Studio City, CA (US)

(73) Assignee: Kapsch Trafficcom AG, Vienna (AT)

( * ) Notice: Subject to any disclaimer, the term of this patent is extended or adjusted under 35 U.S.C. 154(b) by 171 days.

(21) Appl. No.: 12/942,798

(22) Filed: Nov. 9, 2010

(65) Prior Publication Data

US 2012/0115417 A1 May 10, 2012

(51) Int. Cl.
*H04W 4/00* (2009.01)
(52) U.S. Cl. .................. 455/422.1; 455/432.3
(58) Field of Classification Search ................. 455/41.2, 455/422.1, 429, 432.3, 435.2, 435.3, 465–466
See application file for complete search history.

(56) References Cited

U.S. PATENT DOCUMENTS

| | | | | |
|---|---|---|---|---|
| 5,483,669 | A | * | 1/1996 | Barnett et al. ................ 455/437 |
| 6,507,567 | B1 | * | 1/2003 | Willars ........................ 370/321 |
| 6,845,238 | B1 | * | 1/2005 | Muller .......................... 455/436 |
| 2005/0090277 | A1 | * | 4/2005 | Islam et al. ................... 455/525 |
| 2008/0198811 | A1 | | 8/2008 | Deshpande et al. |
| 2011/0183669 | A1 | * | 7/2011 | Kazmi .......................... 455/434 |

OTHER PUBLICATIONS

Extended European Search Report for corresponding European Application No. 11 450 124.0, dated Feb. 21, 2012, 13pp.
Office communication issued on May 16, 2012 in corresponding European Patent Application No. 11 450 124.0, 9pp.

* cited by examiner

*Primary Examiner* — Nay A Maung
*Assistant Examiner* — Angelica Perez
(74) *Attorney, Agent, or Firm* — Christie, Parker & Hale, LLP.

(57) ABSTRACT

A system and method for selecting a preferred connection point from a choice of one or more available connection points in a wireless communication network. The system and method include: determining a link quality for the one or more available connection points; establishing a connection to a first connection point when there is no existing established connection, the first connection point offers a desired service, and the link quality for the first connection point exceeds a first threshold value, wherein a service priority is considered in determining the link quality of the first connection point; maintaining the established connection to the first connection point when the link quality exceeds a second threshold value; and making eligible the established connection to the first connection point for preemption by a second connection point, when the link quality for the first connection point is less than the second threshold value.

18 Claims, 9 Drawing Sheets

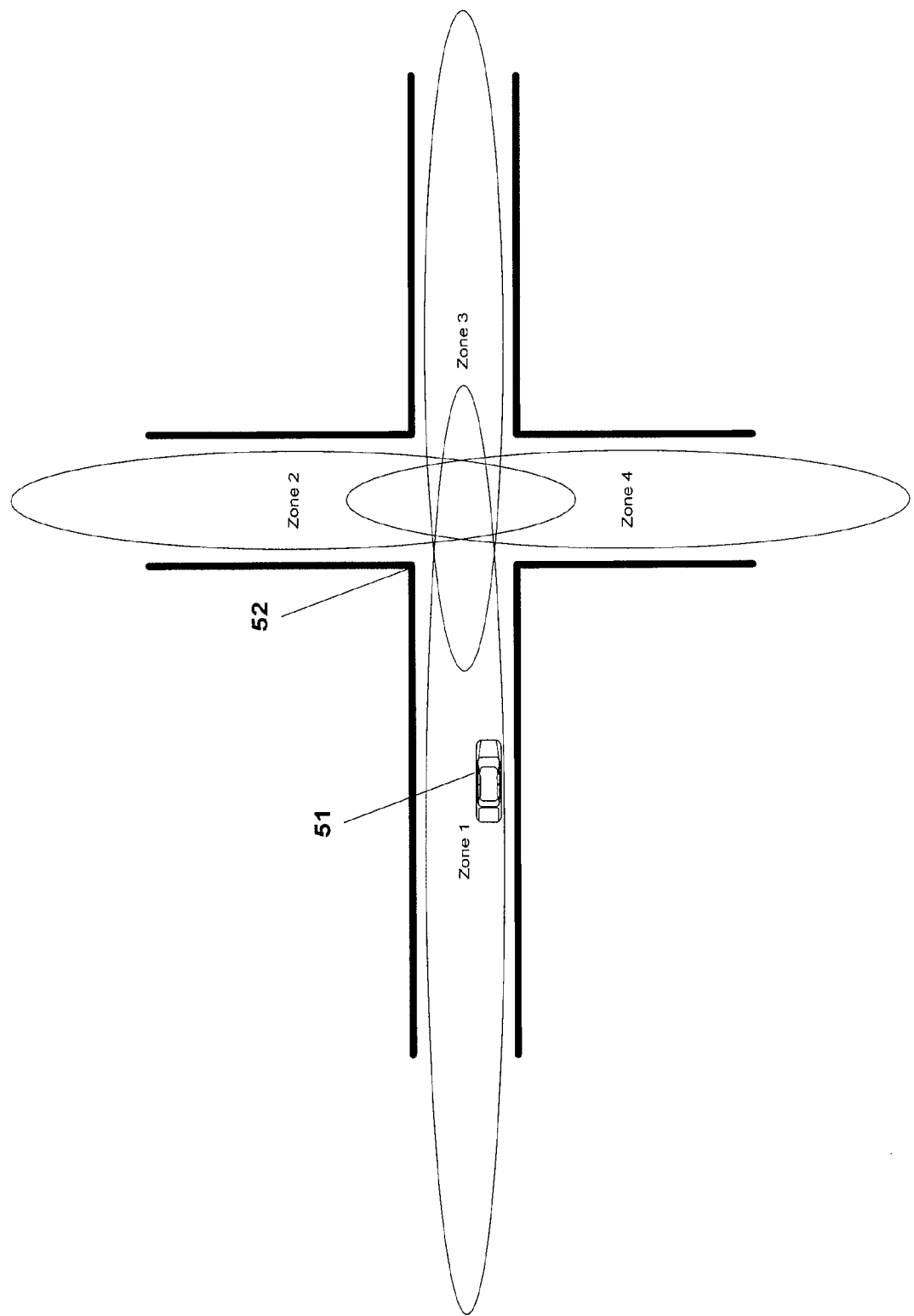

SYSTEM AND METHOD FOR SELECTING SERVICES IN A WIRELESS COMMUNICATION NETWORK

FIELD OF INVENTION

The present invention relates generally to the field of mobile communications, and more particularly, to system and method for selecting services in a communication network.

BACKGROUND

Certain wireless communications systems, such as the Wireless Access in Vehicular Environments (WAVE) system defined by IEEE 1609 family of standards, are comprised of mobile vehicular units and roadside radio access units allowing connectivity into a network infrastructure. The units of these systems exchange both high priority/low latency data (e.g., emergency warnings), and low priority/best effort data (e.g., map updates). They employ a series of radio channels in the 5 GHz band, although operation in other frequency bands is also possible.

Applications, running within a vehicle or mobile host, access applications or services running on network hosts coupled to the wireline network. This is accomplished via a wireless link from the mobile host through a roadside radio connection or access device, and associated network links from the radio connection device through the network to the network host. Mobile hosts may connect through multiple radio connection devices in sequence, experiencing interruptions in connectivity while in between wireless coverage areas.

The mobile environment offers unique challenges for applications, including the following.

With relatively short range communications (e.g., 1000 m), the mobile host's communication zone is limited and its communication opportunities can be short lived.

For mobile applications, the time duration of the connection is critical. Thus, the sooner the mobile application can establish/reestablish its session after reaching an area of coverage, the longer the application has to exchange useful data.

Link quality is also paramount. It may be advantageous for a mobile device to abandon connectivity with a roadside device in order to connect to another device through a higher quality link.

In addition to link quality, it may be advantageous for a mobile device to consider the range of services being offered by a roadside device when deciding where to make its connection.

Once a connection session to the first roadside device is established, a mobile device is communicating to the first roadside device for the duration of the connection session. During that time, mobile application cannot establish a simultaneous communication session with another roadside device.

While the mobile device is communicating to one roadside device, it can still collect link quality characteristics of other nearby roadside devices.

The mobile application has to terminate the first connection session in order to establish the connection session to the second device.

In conventional implementations, decisions are made on the basis of, first, whether a connection point is available, and second, whether it offers a service of interest to the mobile unit. Upon making connection, the connection is held as long as possible, for example, until the mobile unit moves out of range.

This results in at least two problems. The first problem is that connections might be attempted before adequate link quality is achieved, resulting in marginal or intermittent connectivity. The second problem is that once a connection is made, no attempt is made to recognize a more advantageous connection point that might become available.

Therefore, there is a need for a system and method that allows the mobile device to choose an optimal connection point when multiple connection points are available. There is also a need to mitigate the problem of attempting marginal connections.

While sharing some characteristics with cellular communication systems, the WAVE is distinct in several ways. First, a cellular system is intended to provide wide area coverage. The WAVE system uses short range communication links and often provides discontinuous "hot spot" coverage in local areas. Second, each cellular base offers a homogenous set of services (voice, short messaging, etc.); selection of the connection point is not made based on service offering. A WAVE connection point may offer a single specialized service (e.g., parking services) or a selection of services. Whereas a cellular system is engineered to minimize the overlap between adjacent coverage areas, multiple WAVE connection point, each offering its own set of services, may be located in close proximity. An example would be two parking services, each operated by a garage on each side of the street.

A cellular handset prefers to always remain in connection with the cellular network. A mobile WAVE device would prefer to be in an unconnected state where it can scan for potentially interesting services, rather than remain connected to a connection point that does not offer information of value.

These differences call for a different set of service selection methods for WAVE than have been used in cellular systems. When choosing among multiple possible cellular connections (between a handset and one of multiple base stations), the selection criteria are link quality and base station loading. Type of service is not a criterion, since base stations within a carrier's network generally offer similar services. When choosing among multiple possible WAVE connections, the selection criteria used by the invention disclosed herein are, first, services offered, and then link quality. A connection point with an uninteresting service will not be accessed, regardless of a good link quality. Likewise a connection point with a poorer link quality but more interesting set of services would be chosen over a connection point with better link quality but less interesting services.

SUMMARY OF THE INVENTION

In some embodiments, the present invention is a system and method for selecting a preferred connection point from a choice of one or more available connection points in a wireless communication network. The system and method include: determining a link quality for the one or more available connection points; establishing a connection to a first connection point when there is no existing established connection, the first connection point offers a desired service, and the link quality for the first connection point exceeds a first threshold value, wherein a service priority is considered in determining the link quality of the first connection point; maintaining the established connection to the first connection point when the link quality exceeds a second threshold value; and making eligible the established connection to the first connection point for preemption by a second connection point, when the link quality for the first connection point is less than the second threshold value.

The established connection to the first connection point may be abandoned when the link quality for the first connection point is less than a third threshold value.

Furthermore, the first connection point may be preempted by the second connection point according to a fourth threshold value, which is a differential between the link quality of the established connection to the first connection point and the link quality of the second connection point.

BRIEF DESCRIPTION OF THE DRAWINGS

FIG. 5 shows an exemplary intersection with overlapping zones of coverage, according to some embodiments of the present invention.

DETAILED DESCRIPTION

In some embodiments, the present invention is a method and system for selecting a preferred connection point from a choice of one or more available connection points in a wireless communication network based on whether the connection point provides the desired service and the link quality.

Figure 1:
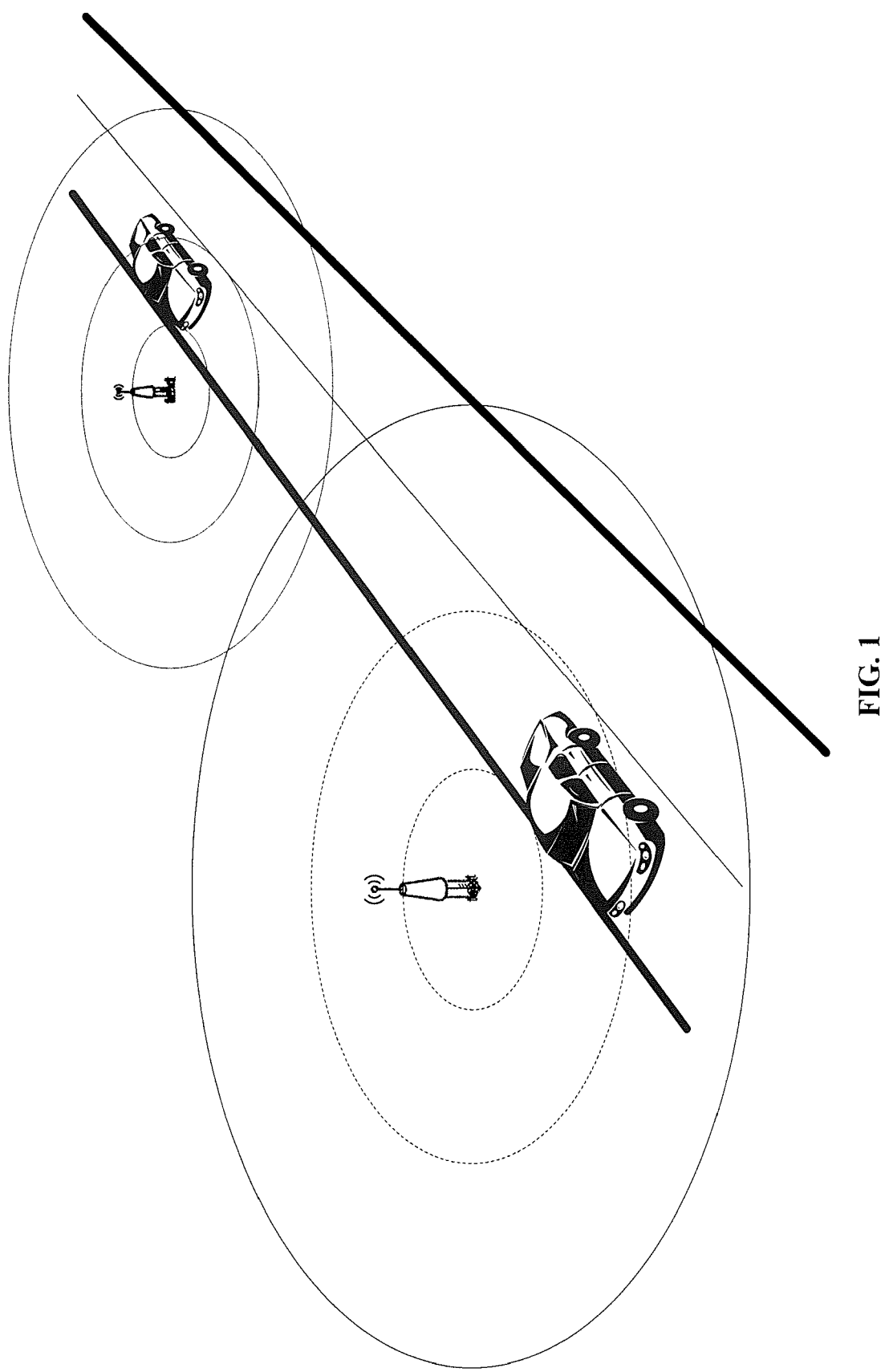
FIG. 1 illustrates vehicles moving along a roadway, passing roadside antenna units at intervals, according to some embodiments of the present invention.

FIG. 1 illustrates vehicles moving along a roadway, passing roadside antenna units at intervals, according to some embodiments of the present invention. As shown, there may be multiple connection options available at a given point in space and time. A mobile unit desiring connectivity may not have enough resources (e.g., radios) to connect to all connection points. The present invention provides decision criteria for selecting the right connection point(s) among the multiple connection points.

Figure 2:
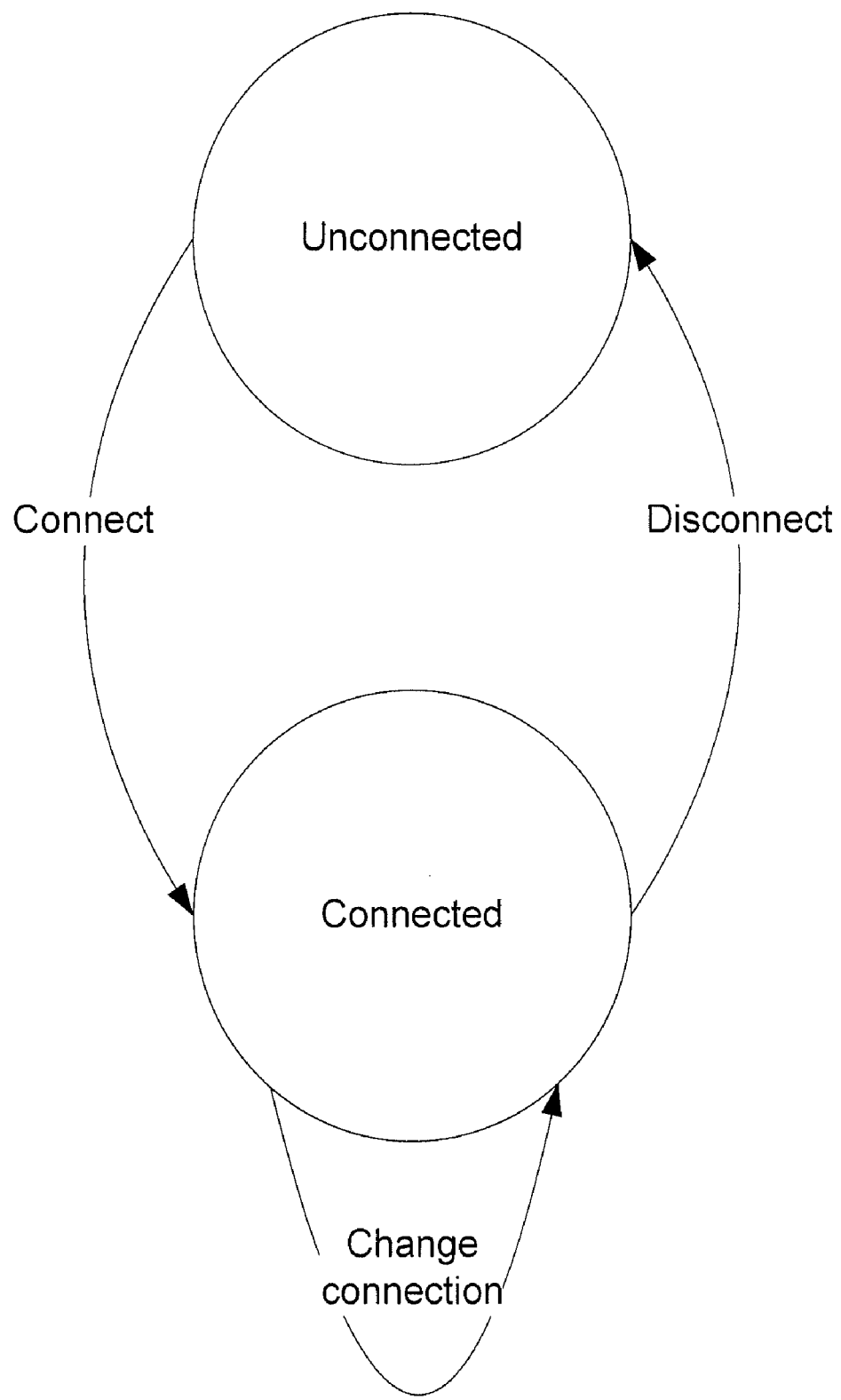
FIG. 2 shows an exemplary state diagram, according to some embodiments of the present invention.

The decision includes 1) when to connect to a connection point from an unconnected state, 2) when to change connection points, and 3) when to disconnect. This is illustrated in FIG. 2 (explained in more detail below), where each arrow between one of the two system states ("Connected" and "Unconnected") represents one of the decisions. The primary criteria used are the services offered by the connection point and the quality of the link between the connection point and the mobile unit. Link quality may be simply estimated in a radio environment through monitoring received signal strength over time, however, any link quality metric may be used without altering the nature of the invention.

The invention also accounts for priorities that may be assigned to different connection points. This accounts for the possibility that the different connection points may have aspects that are more or less appealing to the mobile unit. For example, one connection point may offer a more up-to-date information service than another, making it more desirable (assuming adequate link quality).

Figure 3A:
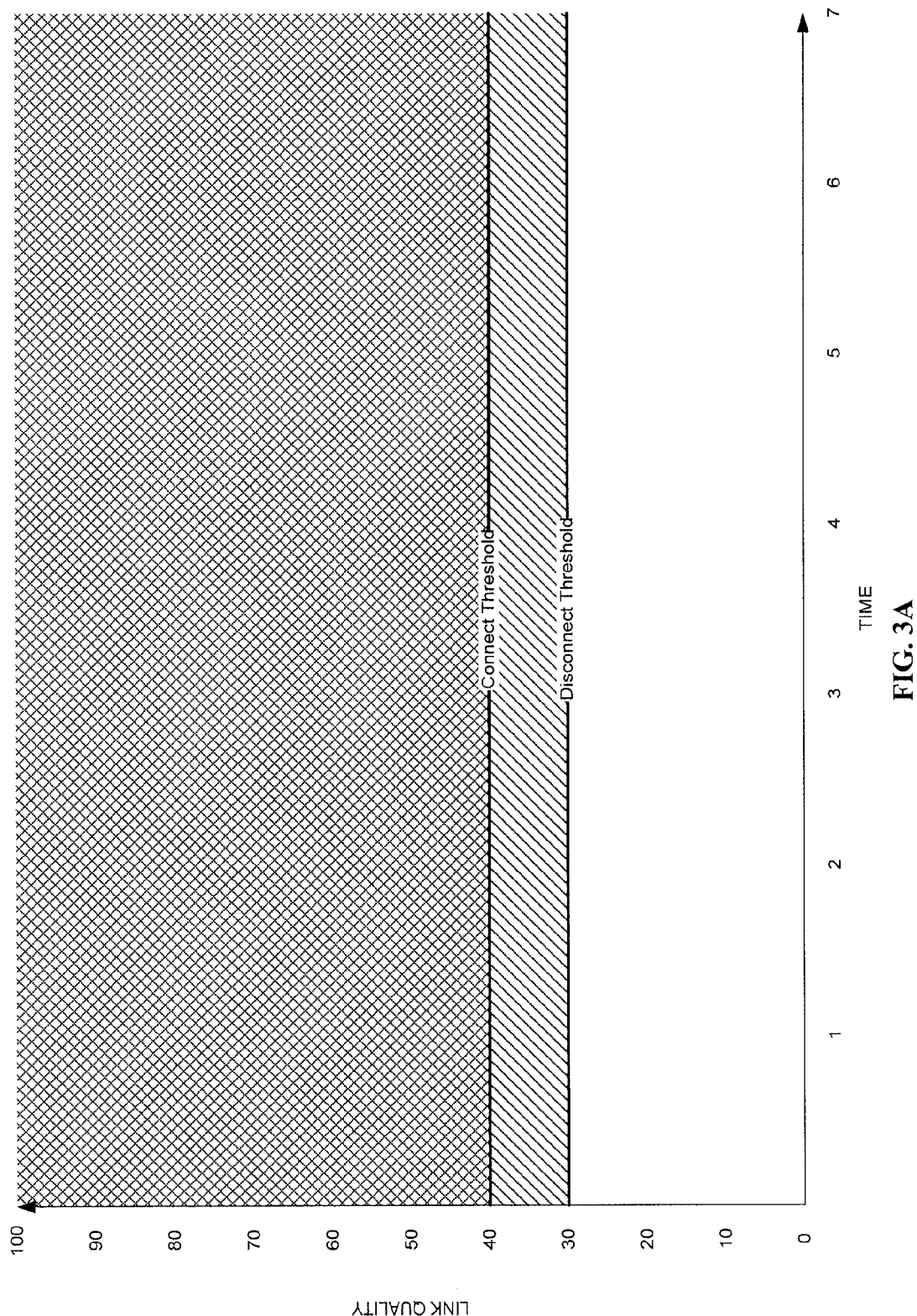
FIGS. 3A and 3B depict an exemplary simplified decision threshold graph according to some embodiments of the present invention.
Figure 3B:
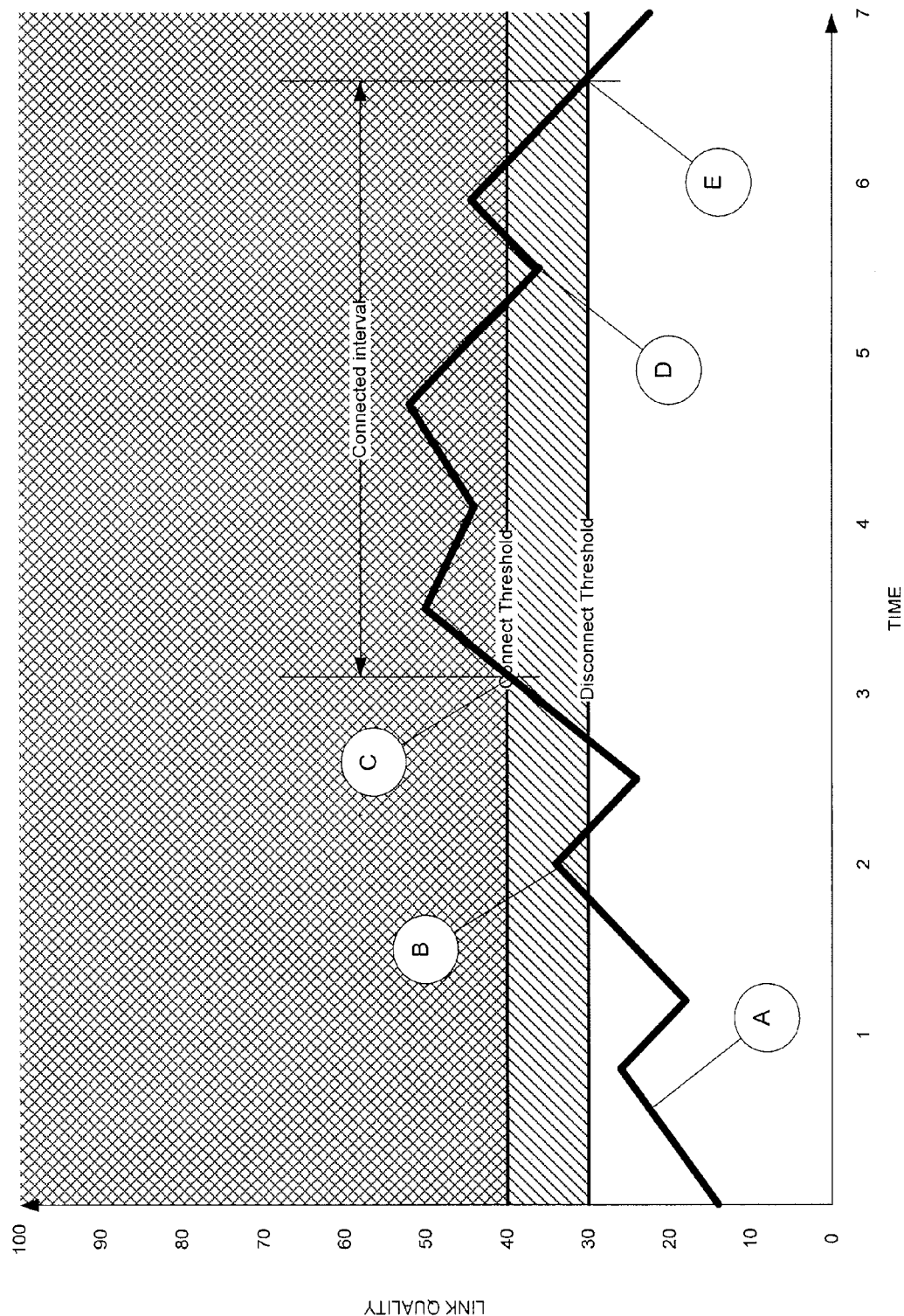

FIGS. 3A and 3B depict an exemplary simplified decision threshold graph according to some embodiments of the present invention. Consider the simplified decision threshold graph shown in FIG. 3A. As shown, Link Quality is charted on the vertical axis, normalized from 0 (minimum) to 100 (maximum); time is charted on the horizontal. Two Link Quality thresholds are identified. Connect Threshold is the Link Quality value above which a connection is established. Disconnect Threshold is the Link Quality value below which an established connection is abandoned. Thus Link Qualities in the double-shaded zone always result in connections; Link Qualities in the single-shaded zone result in connections only if they have already been established. A connection in the double-shaded zone is considered good. A connection in the single-shaded zone is of reduced quality and in danger of being lost. In the unshaded zone, there are no connections due to poor Link Quality.

FIG. 3B shows an example of changing Link Quality over time, with connection decisions made according to the simplified decision threshold graph. The dark line shows the varying link quality between the connection point and the mobile unit over time. At point A, the connection point is recognized and determined to be of interest, but the Link Quality is not adequate for connection (i.e., does not exceed the Connect Threshold). Even at point B, the Connect Threshold is not reached, as a result, no action is taken. However, at point C, the Link Quality surpasses the Connect Threshold, accordingly, a connection is made. The connection is retained through point D, when the Link Quality falls below the Connect Threshold, all the way to point E, when the Link Quality goes below the Disconnect Threshold, at which time the connection is abandoned. The hysteresis between the Connect Threshold and Disconnect Threshold prevents rapid toggling of connections under marginal link conditions. Appropriate values for the thresholds may be determined analytically or through experiment. For example, if the nominal sensitivity of the receiver is −85 dBm, the Connect Threshold might be set to around −75 dBm to ensure a strong connection, and the Disconnect Threshold might be set to about −85 dBm.

Threshold values can also be controlled dynamically. For example, in a rural zone where RSE density is low, connect threshold values can be lowered and thus making OBU more sensitive to RSE information. Similarly, in an urban area, where RSE density is higher, the threshold values can be increased thus making OBU less receptive to weaker signals. Moreover, the threshold values may be calculated by the mobile unit based on its own capabilities or its knowledge of its environment; the values could be calculated off line and configured into the mobile units; or the values could be calculated by a stationary unit considering the local environment or the capabilities of the mobile unit and delivered to the mobile units via the communications link. Furthermore, the threshold values can be determined by the mobile unit to meet user configuration preferences, performance targets, application needs, or weather conditions.

FIGS. 3A and 3B only account for the presence of a single connection point. In some cases, it is desirable to preempt the current connection by switching to another connection with higher Link Quality (or with preferable services). Once again, though, it is undesirable for a mobile device to experience multiple unnecessary and disruptive switches between connection points.

Figure 4A:
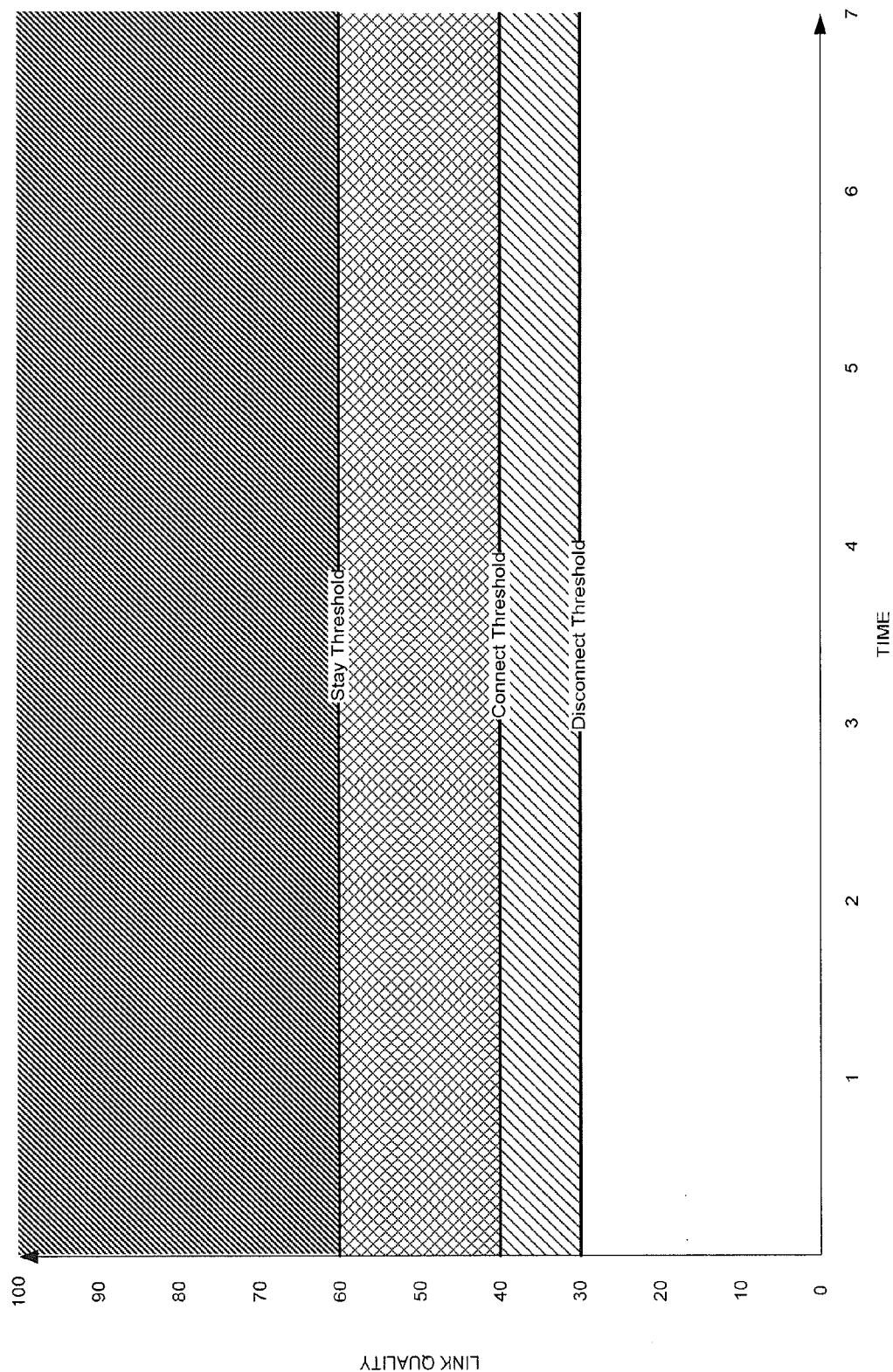
FIGS. 4A and 4B show an extended exemplary decision threshold graph according to some embodiments of the present invention.
Figure 4B:
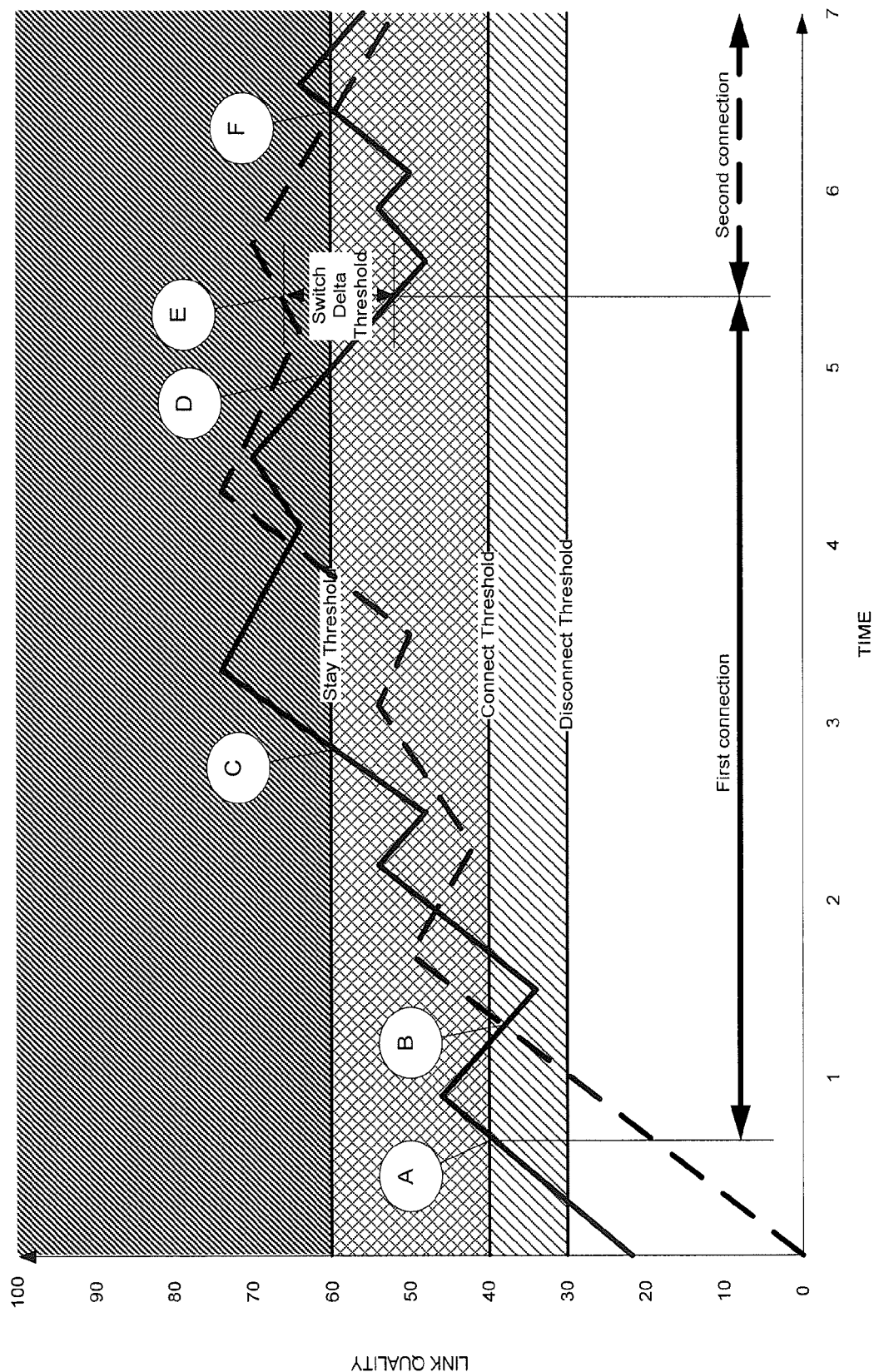

FIGS. 4A and 4B show an extended exemplary decision threshold graph according to some embodiments of the present invention. FIG. 4A illustrates how the invention accounts for the presence of multiple connection points, in some embodiments. A Stay Threshold is added. When a connection's Link Quality exceeds the Stay Threshold (i.e., is in the densely shaded zone), the connection is considered to be excellent and may not be preempted by another connection. A connection with Link Quality below the Stay Threshold (i.e., in the double- or single-shade zone) is of good quality but is eligible for preemption if a "better" connection option is available.

One more threshold is added to prevent a disruptively high number of preemptions. The Switch Delta Threshold is the difference in Link Quality required between two connections before preemption is allowed.

As shown in FIG. 4B, a first connection (solid line) is established at point A. A second connection option (dotted line) is recognized. Between points A and C, the second connection does not preempt the first connection, even though its Link Quality surpasses that of the first connection at point B, because the Link Quality differential does not exceed the Switch Delta Threshold. Between points C and D, the Link Quality of the first connection exceeds the Stay Threshold, making it ineligible for preemption, regardless of the second Link Quality. At point E however, the first Link Quality is less than the Stay Threshold, and the second Link Quality exceeds the first by the Switch Delta Threshold, so the second connection preempts the first. At point F, the first Link Quality again exceeds the second, but not by the Switch Delta Threshold, so no preemption occurs.

FIG. 5 shows an exemplary intersection with overlapping zones of coverage, according to some embodiments of the present invention. The figure also illustrates the utility of the present invention in a WAVE scenario. As shown, the vehicle 51 is initially in zone 1, i.e., where it can achieve a high quality connection with connection point 1. It is approaching an intersection 52 where the link to connection point 1 loses strength, and other connection points become available. The vehicle does not abandon the first connection until two conditions are met. First, its Link Quality must not be excellent (i.e., fall below the Stay Threshold). Second, the Link Quality associated with another connection point must exceed that of the current connection by some margin (i.e., the Switch Delta Threshold). Although, WAVE systems are used in this disclosure as an example, the invention is suitable for any communication system that includes the capability of choosing among multiple connection options.

According to some embodiments of the present invention, at some point around the intersection, the vehicle preempts the connection with connection point 1 and establishes a connection with connection point 3, which supports coverage zone 3, without knowledge of its own location or the location of the connection points. According to some embodiments, the vehicle may preempt the connection with connection point 1 and establish a connection with connection point 3, using location data.

It is not desirable that the vehicle connects to the connection points represented by either zone 2 or zone 4, since the vehicle will quickly transit those zones. To prevent this, Link Quality may include a time component. For example, a weighted average of the latest N signal strength measurements could be used for the Link Quality. Furthermore, the signal threshold may be dynamically adjusted for optimal filtering.

An example of a weighted average would incorporate knowledge of N recent link measurements, as shown below. The weighted Link Quality L is the average of N products, each consisting of a weight W multiplied by a measurement value M. In general, the more recent measurements have higher weights, i.e., $W_A \geq W_B \geq \ldots \geq W_N$.

$$L = (W_A M_A + W_B M_B + \ldots + W_N M_N)/N \quad (1)$$

Other weighting algorithms may be used. In some embodiments, the present invention employs time delays as well as hysteresis thresholds to prevent frequent changes in connectivity.

FIG. 2 shows an exemplary state diagram, according to some embodiments of the present invention. Any pair of the change types possible in FIG. 2 (Connect to Change, Change to Change, Change to Disconnect, Connect to Disconnect, Disconnect to Connect) may have a time parameter associated with it. If a time duration exceeding the time parameter value has not elapsed since the first change, then the second change is not allowed.

In some embodiments, different connection points may offer different types of service, some or all of which having a different priority. For example, one connection point might offer a weather service; another might offer traffic; another might offer both. A simple implementation would include a binary connection decision (yes/no) for each connection point related to the presence of a service of interest to the mobile. In some embodiments of the present invention, a priority is assigned to each service, by the system or by the user. For example, a user may indicate a desire for parking and therefore any services related to parking will be treated as higher priority service, compared to, for example, weather services.

The nature of the service priority is not critical to the operation of the invention, that is, different connections could have different priorities based on the information exchanges available through that connection point and perhaps the intrinsic state of the device. For example, a connection point offering map data might be of low interest to one mobile unit, but of high interest to another unit whose map data is out of date or because of user preferences established in the device. The presence of one or more services of interest to the mobile increases the metric (now a combined Link Quality and Priority metric) associated with a connection point and compared to the various threshold levels in making connect/disconnect/preempt decisions. The service priority may be determined by information delivered by a service provider over the wireless communication network.

Figure 6:
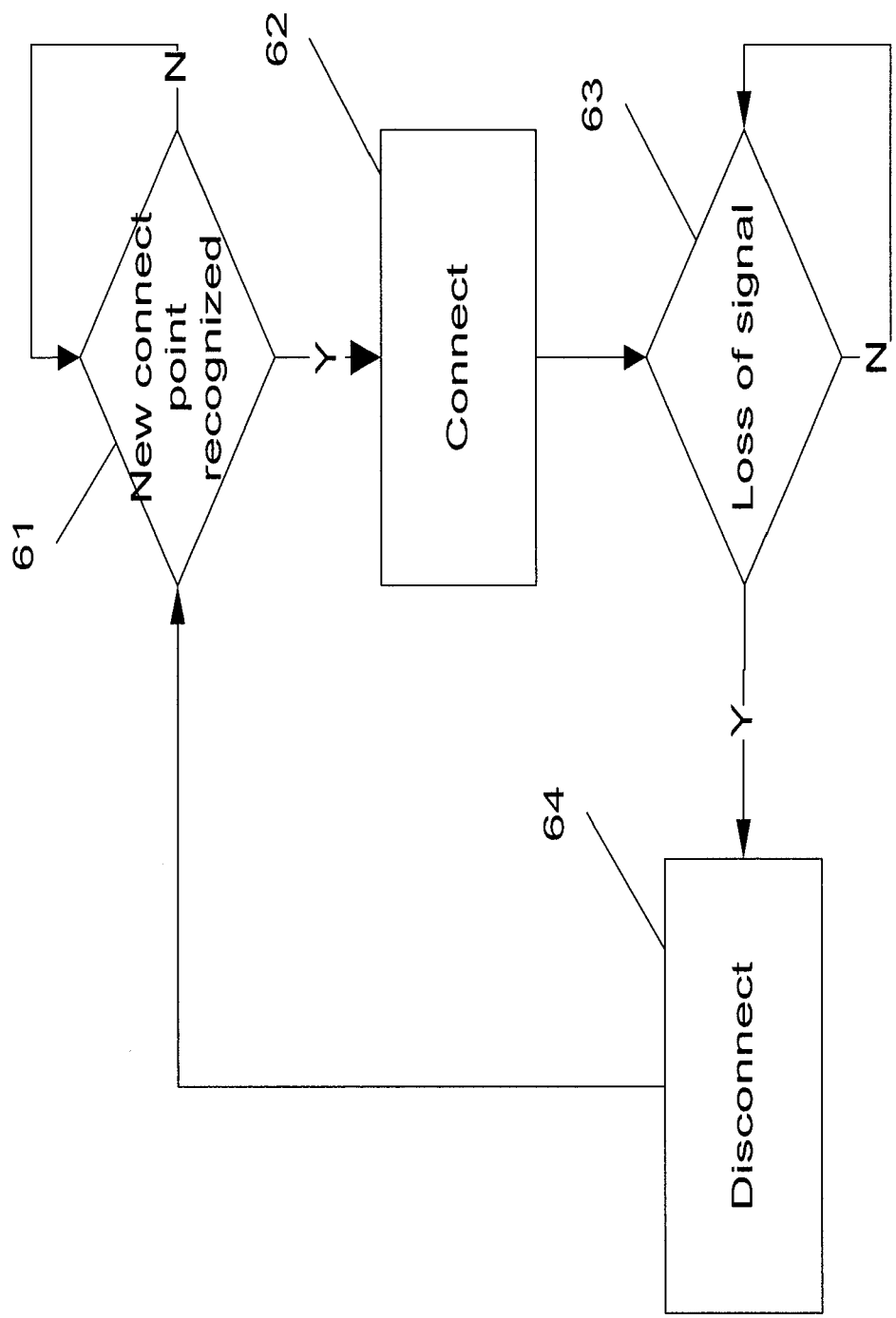
FIG. 6. shows a process flow diagram, according to the prior art.

FIG. 6. shows a process flow diagram, according to the prior art. As shown in block 61, the process begins when a new connection point is recognized. At this point, a decision is made to connect in block 62. Once connected, no other connection points are considered, until a loss of signal is experienced, in block 63. At this point, the disconnect decision is made in block 64, and the device reverts to monitoring the channel for a new connect point in block 61.

Figure 7:
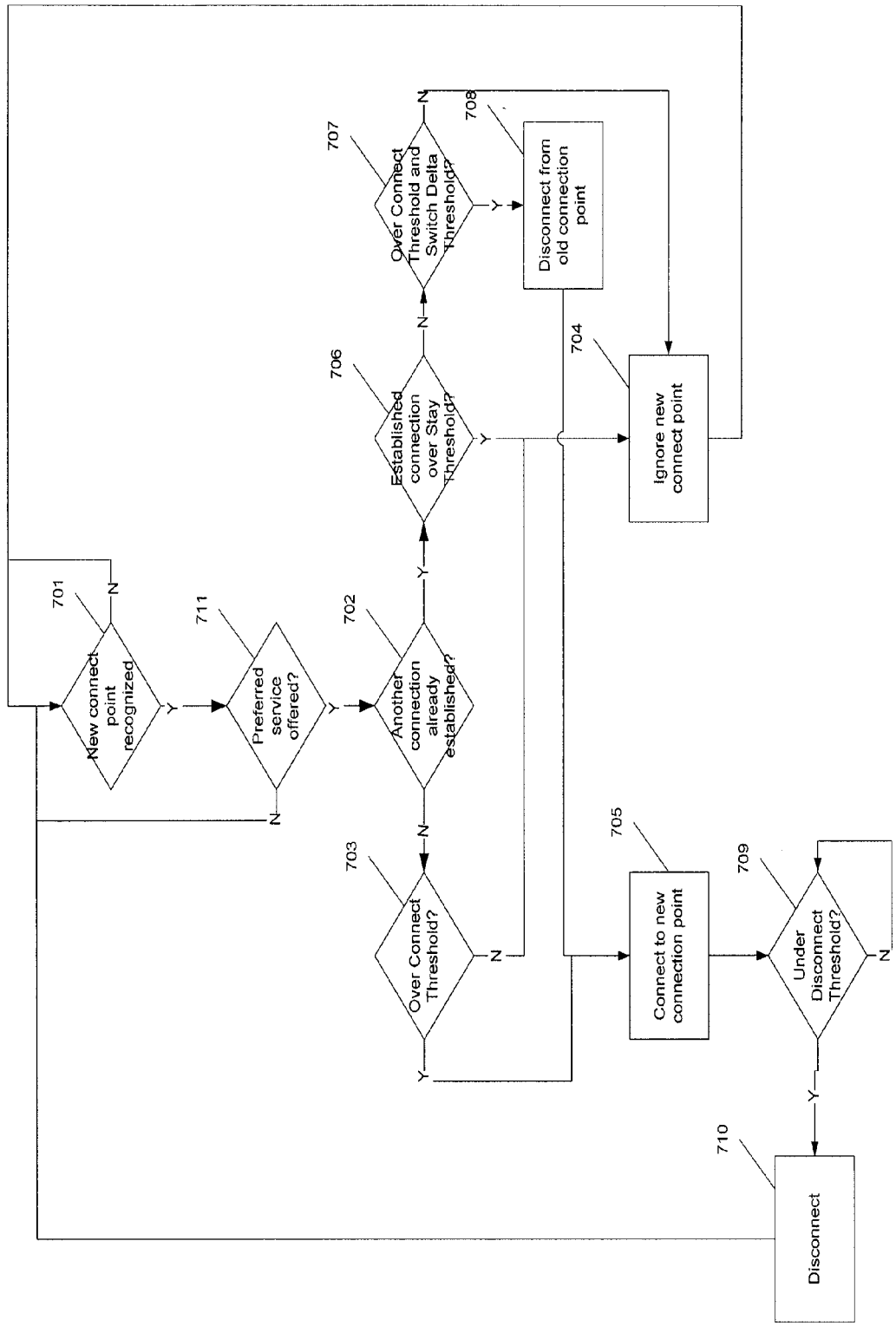
FIG. 7. shows an exemplary process flow diagram, according to some embodiments of the present invention.

FIG. 7 shows an exemplary process flow diagram, according to some embodiments of the present invention. The exemplary process flow of FIG. 7 is executed by one or more computers, for example, one or more mobile units, one or more stationary units, and/or a central processing unit. As shown, a link quality for the one or more available connection points is determined and a connection to a first connection point is established when there is no existing established connection, and the link quality for the first connection point exceeds a first threshold value. The established connection to the first connection point is maintained while the link quality exceeds a second threshold value. The established connection to the first connection point is made/marked eligible for preemption by a second connection point, when the link quality for the first connection point is less than the second threshold value.

As shown in FIG. 7, a new connect point is recognized in block 701. The connection point is first evaluated to determine whether it offers a preferred service 711; if not the connection point is ignored. Otherwise, a check is made to see if a connection has already been established in block 702. If no connection has been established and the new connection point's link quality does not exceed the Connect Threshold, the potential connection is not accessed, as shown in block 704. However, if the new connection point's link quality exceeds the Connect Threshold in block 703, a connection is established in block 705.

If the new connection point is recognized in block 701 when a connection already exists in block 702, then the existing connection's link quality is compared to the Stay Threshold, as shown in block 706. If the Stay Threshold is exceeded, the potential connection is not acted upon in block 704. If the Stay Threshold is not exceeded by the existing link, the potential connection's link quality is compared to the Connect Threshold, and also the difference between the potential connection's link quality and the existing connection's link quality compared to the Switch Delta Threshold in block 707. If both of these thresholds are exceeded, the existing connection is terminated 708 and the new connection is established in block 705.

Once a connection is established in block 705, the Disconnect Threshold is monitored in block 709. If the link quality falls below the Disconnect Threshold, the connection is terminated in block 710. While the connection is in place, new potential connections are monitored. This feature is not explicitly shown in FIG. 7 due to the limitations of the flow diagram format in representing parallel tasks.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for connecting a mobile unit to a preferred connection point from a choice of one or more available connection points in a wireless communication network, the method comprising:
    determining a link quality between the mobile unit and the one or more available connection points;
    establishing a connection between the mobile unit and a first connection point when there is no existing established connection, the first connection point offers a desired information service, and the link quality for the first connection point exceeds a first threshold value, wherein an information service priority is considered in determining the link quality of the first connection point;
    maintaining the established connection to the first connection point when the link quality exceeds a second threshold value, which is larger than the first threshold value; and
    making eligible the established connection to the first connection point for preemption by a second connection point, when the link quality for the first connection point is less than the second threshold value, wherein the first connection point is preempted by the second connection point when the second connection point offers at least one desired information service, the link quality for the second connection point exceeds the first threshold, and the difference between the link quality of the established connection to the first connection point and the link quality of the second connection point exceeds a fourth threshold value.

2. The method of claim 1, further comprising abandoning the established connection to the first connection point when the link quality for the first connection point is less than a third threshold value.

3. The method of claim 1, wherein the service priority is determined by information delivered by a service provider over the wireless communication network.

4. The method of claim 1, wherein determining the link quality is based on received signal strength.

5. The method of claim 4, wherein the received signal strength is time-averaged.

6. The method of claim 5, wherein a weighting factor is used for the signal strength time-average.

7. The method of claim 1, wherein establishing a connection to the first connection point includes considering a time duration since a previous change of connection.

8. The method of claim 7, wherein the previous change of connection is one or more of the group consisting of a connection establishment, a connection preemption, and a connection abandonment.

9. The method of claim 3, wherein preempting the first connection point includes considering a time duration since a previous change of connection.

10. The method of claim 9, wherein the previous change of connection is one or more of the group consisting of a connection establishment, a connection preemption, and a connection abandonment.

11. The system of claim 1, wherein the service priority is determined by information delivered by a service provider over the wireless communication network.

12. The method of claim 2, wherein any one of the first, second, or third thresholds is dynamically adjusted.

13. A system for selecting a preferred connection point from a choice of one or more available connection points in a wireless communication network comprising:
    means for determining a link quality between a mobile unit and the one or more available connection points;
    means for establishing a connection between the mobile unit and a first connection point when there is no existing established connection, the first connection point offers a desired information service, and the link quality for the first connection point exceeds a first threshold value wherein an information service priority is considered in determining the link quality of the first connection point;
    means for maintaining the established connection to the first connection point when the link quality exceeds a second threshold value, which is larger than the first threshold value; and
    means for making eligible the established connection to the first connection point for preemption by a second connection point, when the link quality for the first connection point is less than the second threshold value, wherein the first connection point is preempted by the second connection point when the second connection point offers at least one desired information service, the link quality for the second connection point exceeds the first threshold, and the difference between the link quality of the established connection to the first connection point and the link quality of the second connection point exceeds a fourth threshold value.

14. The system of claim 13, further comprising means for abandoning the established connection to the first connection point when the link quality for the first connection point is less than a third threshold value.

15. The system of claim 13, wherein determining the link quality is based on received signal strength.

16. The system of claim 15, wherein the received signal strength is time-averaged.

17. The system of claim 16, wherein a weighting factor is used for the signal strength time-average.

18. The system of claim 13, wherein the service priority is determined by information delivered by a service provider over the wireless communication network.

* * * * *